Figure 1:
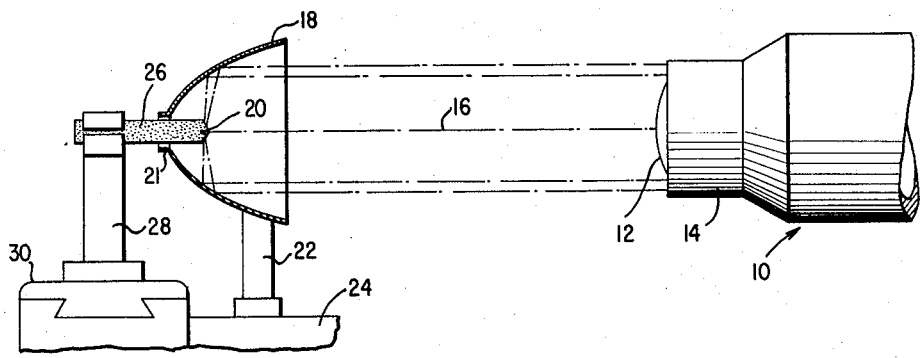

Sept. 15, 1964   A. J. COAKLEY   3,148,582
OPTICAL COMPARATOR LIGHT CONCENTRATING ATTACHMENT
Filed March 7, 1961

*INVENTOR.*
ARTHUR J. COAKLEY
BY
*ATTORNEYS.*

United States Patent Office 3,148,582
Patented Sept. 15, 1964

3,148,582
OPTICAL COMPARATOR LIGHT CONCENTRATING ATTACHMENT
Arthur J. Coakley, Springfield, Vt., assignor to Textron Inc., Providence, R.I.
Filed Mar. 7, 1961, Ser. No. 93,964
3 Claims. (Cl. 88—24)

This invention relates to improvements in episcopic illumination arrangements for optical comparators and more particularly relates to a light concentrating attachment adapted for use with an optical comparator.

Optical comparators are widely utilized in industry for comparison of precision workpieces with known standards. An example of such a comparator is disclosed in the patent to Young, 2,802,393. In optical comparators, two general types of illumination are employed, episcopic and diascopic illumination. In diascopically illuminated comparators, collimated light is projected past an object or workpiece to be inspected and a shadow image or profile of the workpiece is projected by a magnifying lens system onto a viewing screen. The Young patent referred to above employs such diascopic illumination. The other type of illumination is episcopic illumination in which an image of a surface of a workpiece to be inspected is projected onto a viewing screen. Utilizing episcopic illumination, it is necessary to illuminate the surface and project the resulting reflected image onto the viewing screen. A comparator utilizing episcopic illumination is disclosed in the Beardsley Patent 2,031,201. In episcopic illumination for comparators, the light may, if desired, be transmitted directly through the lens train of the comparator. Such an arrangement is shown in the Stevens Patent 2,843,009.

Since the major portion of the cost of an optical comparator consists of the base stand and components other than the optical system, it is, of course, highly desirable to be able to utilize one comparator for both episcopic and diascopic illumination, thereby greatly increasing the flexibility of usage. When episcopic illumination is utilized, light may be transmitted through the lens system of the comparator and a reflected image is provided on the viewing screen. However, by repositioning a collimated light source such that the object is between the light source and the comparator objective, a shadow profile image may be projected onto the viewing screen. It is an object of this invention to provide an improved arrangement in the form of an attachment for an optical comparator to adapt the comparator for concentrating light in episcopic illumination of workpieces. It is an additional object of this invention to provide a light concentrating attachment for an episcopic illumination optical comparator which may be in the form of an attachment to be readily added to existing machines or to be readily removed if it is desired to utilize the machine as a profile projector, i.e. diascopic illumination.

For inspecting certain objects by the use of a diascopic illuminated optical comparator it is highly desirable that the illuminating light strike the object at an angle up to 90° from the optical axis. This provides additional illumination and allows inspection of details which could not be made if the illuminating light were directed only parallel to the optical axis or reflected from a small angle with respect to the optical axis. Accordingly, it is a further object of this invention to provide an attachment for episcopically illuminated optical comparators which is adapted to concentrate the episcopic illumination on the workpiece from a relatively wide angle with respect to the optical axis thereby providing high intensity illumination from the available episcopic light source.

Other objects and advantages of this invention will be pointed out in the following description and claims and illustrated in the accompanying drawing, which discloses, by way of example, the principles of this invention and the best mode which has been contemplated of applying these principles.

Figure 2:
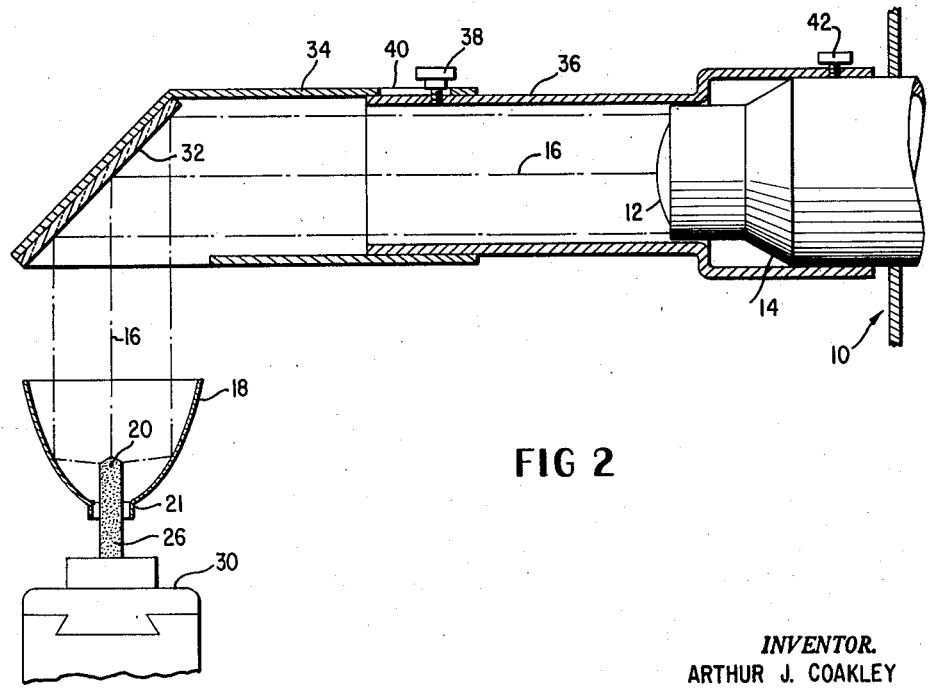

In the drawing:
FIGURE 1 is a side elevation view showing the optical comparator and the light concentrating attachment of this invention.
FIGURE 2 is a side elevation view partially in section showing a modification of the light concentrating attachment wherein the workpiece is staged vertically.

In general, this invention relates to a light concentrating attachment for an optical comparator when the comparator is provided with episcopic illumination through the lens system of the comparator. Such an illumination system is illustrated for example, in the Stevens Patent 2,843,009. The well known comparator of this type includes a workpiece staging means for staging and holding a workpiece and a lens system including an objective lens which is mounted in the casing of the comparator and is visible from the outside of the comparator, and a light source for providing an episcopic illumination from within the comparator casing, as well as the usual projection lens and viewing screen. In episcopic illumination the light provided by the illuminating means passes from the inside of the comparator outwardly from the objective lens as a generally collimated beam, see Stevens Patent 2,843,009, column 2, lines 27–29. The attachment which is the subject of this invention comprises a mirror having a reflecting surface which is a paraboloid of revolution positioned along the optical axis of the objective lens to receive the collimated episcopic illuminating beam and concentrate it generally at the focal point of the paraboloidal mirror. The focal point of the paraboloidal mirror or reflector is on the optical axis at the focal plane of the objective lens. The paraboloidal reflector or mirror is provided with a hole for inserting a workpiece to be inspected, which workpiece or the portion thereof to be inspected, is adapted to be positioned substantially at the focal point of the paraboloidal reflector. With this arrangement, the collimated episcopic illumination beam emanating from the comparator passes outwardly through the objective lens and is reflected from all angles up to 90° with respect to the optical axis as it reflects from the paraboloidal mirror and is concentrated at the focal point of the paraboloidal mirror. This causes intense illumination from the available provided light at the focal point and a workpiece to be inspected, such as the point of a twist drill placed at the focal point, provides an excellent image on the viewing screew.

Referring now to the drawing, in FIGURE 1 a comparator is indicated generally at 10. This comparator may be the type provided with means for episcopic illumination directed outwardly through an objective lens as a beam of generally parallel rays, i.e. a collimated beam. The comparator contains the usual essential elements in addition to the illuminating means, i.e., a projecting lens and viewing screen as well as an objective lens system including an objective lens 12 contained within a lens holder 14 secured to the comparator body. Along the optical axis 16 of the objective lens 12 there is positioned a mirror or reflector 18 having an inner reflecting surface which is a paraboloid of revolution with a focal point 20 within the reflector. The paraboloidal reflector 18 is supported by support means 22 from a suitable reference base 24 of the comparator.

A workpiece, such as a twist drill 26 having a point thereon that is desired to be inspected by viewing on the comparator viewing screen, is held by a work holder 28 staged on a movable worktable 30.

The paraboloidal reflector 18 is provided with an opening 21 in the rear thereof so that the workpiece 26 may be inserted through the opening to position a desired portion of the workpiece at or near the focal point 20 of the paraboloidal reflector 18. Of course, the opening 21 in the paraboloidal reflector 18 could be at other places than at the rear along the optical axis and substantially the same results would be obtained.

FIGURE 2 illustrates a modification of the above described arrangement wherein the workpiece 26 is staged vertically on a work supporting table 30 and the parabolic reflector 18 is a paraboloid of revolution about a vertical axis. Since the optical axis 16 of the comparator's objective 12 is generally horizontal, a plane reflecting surface such as a mirror 32 is provided for reflecting the illumination and image from horizontal to vertical. The mirror 32 is carried by angled support housing 34 which in turn is adjustably positioned on a tubular support 36 by means of a screw 38 and slot 40, while the tubular support 36 in turn is clamped to the lens housing 14 by suitable clamp screw 42. Again, the focal point 20 of the paraboloid of revolution defining the reflecting surface of mirror 18 is generally at the focal plane of the objective lens 12.

With the foregoing attachment when the comparator 10 is utilized with episcopic illumination emanating from within the comparator and directed outwardly through the objective lens 12, generally parallel to the optical axis 16, these rays strike the reflecting surface of paraboloidal reflector 18 wherein they are generally concentrated at focal point 20. By means of such arrangement there is intense illumination for any workpiece staged generally at focal point 20 of paraboloidal reflector 18 and much of this illumination comes from extremely wide angles with respect to the optical axis thus providing, in addition to the intense illumination, an excellent way to view surface details. For variations in the intensity of illumination, the workpiece can be staged slightly off of the focal point of the paraboloidal reflector.

While there have been shown and described and pointed out the fundamental features of the invention as applied to the preferred embodiments, it will be understood that various omissions and substitutions and changes in the form and details of the devices illustrated and the operation thereof may be made by those skilled in the art without departing from the spirit of the invention. It is the intention, therefore, to be limited only as indicated by the scope of the following claims.

I claim:

1. In combination with an optical comparator of the type utilizing episcopic illumination of a workpiece, illumination means directing a collimated beam outwardly of the comparator from an objective lens along an optical axis, a light concentrating attachment comprising: a reflector having an inner surface shaped as a paraboloid of revolution with a focal point therein, a portion of the inner surface of the paraboloid of revolution being removed for the insertion of a workpiece therethrough so that the workpiece may be positioned substantially at the focal point of the paraboloid of revolution, and supporting means for supporting the paraboloid of revolution from a reference base of said optical comparator with the focal point thereof substantially in the focal plane of the comparator objective and on the optical axis to thereby illuminate the object for viewing through the optical system of the comparator.

2. An attachment as defined in claim 1 wherein the portion removed from the paraboloidal reflector for the workpiece insertion is also along the optical axis.

3. In combination with an optical comparator of the type utilizing episcopic illumination of a workpiece, illumination means directing a collimated beam outwardly from the comparator from an objective lens along an optical axis, a light concentrating attachment comprising: a reflector mirror having a surface formed as a paraboloid of revolution having a focal point therein along the optical axis substantially at the focal plane of the objective lens, means for supporting a workpiece desired to be inspected such as a drill or the like positioned substantially at the focal point of the paraboloid of revolution, a support housing attached to the objective lens of the optical comparator, a flat mirror carried within the support housing and positioned on the optical axis between the objective lens of the episcopic comparator and the parabolic reflector to reflect illuminating rays from the episcopic objective of the comparator along the optical axis onto the surface of the parabolic mirror to the focal point thereof to thereby illuminate a workpiece positioned at the focal point to thereby illuminate the object for viewing through the optical system of the comparator.

References Cited in the file of this patent

UNITED STATES PATENTS

| 1,906,459 | Goldrei | May 2, 1933 |
| 2,226,677 | Vikhman | Dec. 31, 1940 |
| 3,010,358 | Siegler | Nov. 28, 1961 |

FOREIGN PATENTS

| 355,946 | Germany | July 10, 1922 |
| 401,591 | Great Britain | Nov. 16, 1933 |